United States Patent
Hamilton et al.

(10) Patent No.: US 7,562,189 B2
(45) Date of Patent: Jul. 14, 2009

(54) WRITE-IN-PLACE WITHIN A WRITE-ANYWHERE FILESYSTEM

(75) Inventors: Eric Hamilton, Durham, NC (US); John A. Scott, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 290 days.

(21) Appl. No.: 11/529,858

(22) Filed: Sep. 28, 2006

(65) Prior Publication Data

US 2008/0082590 A1 Apr. 3, 2008

(51) Int. Cl.
*G06F 12/16* (2006.01)
(52) U.S. Cl. .................. 711/114; 711/155; 711/203
(58) Field of Classification Search .................. None
See application file for complete search history.

(56) References Cited

U.S. PATENT DOCUMENTS

| | | | |
|---|---|---|---|
| 6,742,081 B2 * | 5/2004 | Talagala et al. | 711/114 |
| 6,983,296 B1 | 1/2006 | Muhlestein et al. | |
| 7,243,207 B1 * | 7/2007 | Prakash et al. | 711/202 |
| 7,321,962 B1 * | 1/2008 | Fair et al. | 711/202 |
| 7,409,494 B2 * | 8/2008 | Edwards et al. | 711/114 |
| 2004/0221125 A1 | 11/2004 | Ananthanarayanan et al. | |
| 2005/0228963 A1 * | 10/2005 | Rothman et al. | 711/170 |

FOREIGN PATENT DOCUMENTS

| | | |
|---|---|---|
| WO | WO93/00635 | 1/1993 |
| WO | WO/02/08899 | 1/2002 |
| WO | WO/2005/111803 | 11/2005 |

OTHER PUBLICATIONS

International Search Report and Written Opinion mailed May 16, 2008 for International Patent Application No. PCT/US2007/020984.

* cited by examiner

*Primary Examiner*—Than Nguyen
(74) *Attorney, Agent, or Firm*—Blakely, Sokoloff, Taylor & Zafman LLP.

(57) ABSTRACT

In a write-anywhere filesystem, a write-in-place property allows the write-anywhere filesystem to selectively perform write-in-place processing for write allocation to selected data blocks. The filesystem stores a data block in a storage, and references the data block with both physical and virtual or logical block number references. The block number references allow the filesystem to manage storage of the data blocks through indirection. The data block may be modified, which generates an updated data block in memory having the new data. The filesystem performs write allocation to store the updated data block to the storage. Write-in-place within the write-anywhere filesystem allows the write-anywhere filesystem to write the data block to the same physical location and thus maintain the same physical block number reference while modifying the virtual block number reference.

16 Claims, 6 Drawing Sheets

WRITE-IN-PLACE WITHIN A WRITE-ANYWHERE FILESYSTEM

FIELD

Embodiments of the invention relate to file storage and more particularly to a storing a file with a write-in-place technique in a write-anywhere filesystem.

BACKGROUND

A storage system includes multiple storage devices or disks coupled with interconnecting hardware and control hardware. The control hardware may be referred to as a storage server, which is a special-purpose processing device used to store and retrieve data on behalf of clients of the storage system. The storage server includes a filesystem and/or comparable management resources that manage the data storage of the disks in the storage system.

The data storage area of the disks is often divided into data blocks, which are managed by the filesystem. The filesystem determines how and where data will be stored and retrieved. The disks can be organized into one or more groupings (physical and/or logical) of redundant arrays of inexpensive/independent disks/drives (RAID). The data may be organized, managed, and accessed as data files, and/or as data blocks that include more or less information than a file. Hence, the storage server may be a file server that provides clients with file-level access to data, and/or a storage server that provides clients with block-level access to stored data.

Storage servers are traditionally either write-anywhere or write-in-place. A write-in-place approach writes a data block to the same physical location on disk when the data block is modified. In contrast, a write-out-of-place approach writes a modified data block to a new physical location on disk. A write-out-of-place filesystem stores data in unallocated blocks instead of writing over already allocated data blocks. Thus, data is not overwritten, and a particular storage space is traditionally not used for a subsequent write that changes data stored at the particular storage space. Write-anywhere may be used in conjunction with write-out-of-place. A filesystem having a write-anywhere property can write to any unallocated block on any available disk in a group, and does not have to write to a particular physical location for a particular "file" or block of data. An example of a filesystem using write-anywhere in conjunction with write-out-of-place is the Write-anywhere File Layout (WAFL®) filesystem included in Filer products made by Network Appliance, Inc. of Sunnyvale, Calif.

A write-anywhere filesystem generally allows for fast data writes and point in time filesystem copies. Additionally, a write-anywhere filesystem generally enables relatively fast recovery from system failures. However, under certain work loads (e.g., random overwrite of large files such as database tables), the behavior of a write-anywhere filesystem can degrade read and write performance of the storage system. When a storage system is initialized, the disks include large amounts of contiguous free space, and large files (e.g., databases, logical unit numbers (LUNs), databases on LUNs) are initially stored in sequential physical storage space. As the file is modified over time, the write-anywhere filesystem writes the modified data to new locations, leaving space in the physical layout of the file. As the file ages, its blocks are spread across one or more disks in the storage system, which degrades sequential read performance as seek times rise. Write speed is also negatively affected as disk heads seek over fragmented disk free space. The benefits of the write-any- where filesystem with respect to smaller files may be at least partially offset by the costs associated with its performance on large files.

SUMMARY

In a write-anywhere filesystem, a write-in-place property allows the write-anywhere filesystem to selectively perform write-in-place processing for write allocation to selected data blocks. The filesystem stores a data block in a storage, and references the data block with both physical and virtual or logical block number references. The block number references allow the filesystem to manage storage of the data blocks through indirection. The data block may be modified, which generates an updated data block in memory having the new data. The filesystem performs write allocation to store the updated data block to the storage. Write-in-place within the write-anywhere filesystem allows the write-anywhere filesystem to write the data block to the same physical location and thus maintain the same physical block number reference while modifying the virtual block number reference.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
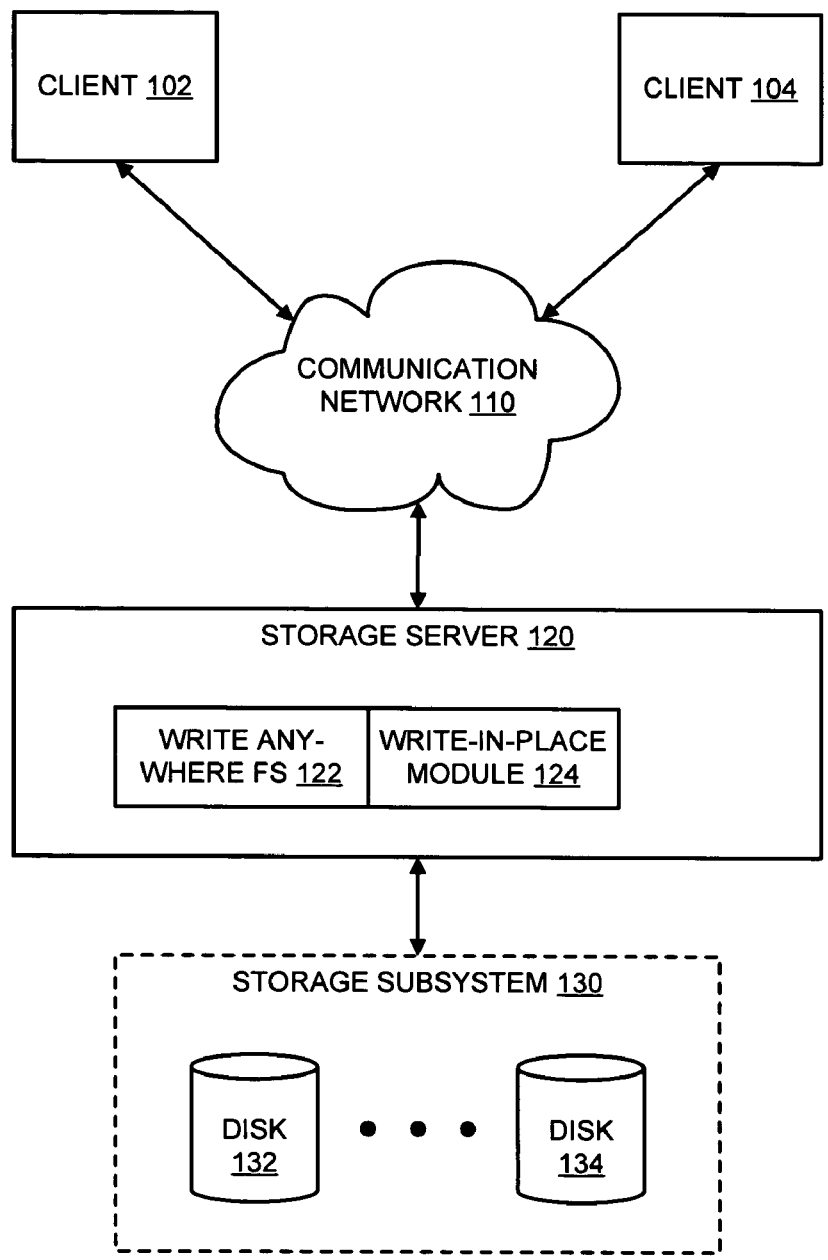
FIG. 1 is a block diagram of an embodiment of a storage server with a write-in-place module coupled to a storage subsystem.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A write-anywhere filesystem can be enabled to selectively store data with a write-in-place approach. Thus, the general behavior of a write-anywhere filesystem that spreads data across disks can be selectively controlled for data associated with large files or other data for which a sequential physical storage layout may be desired (e.g., data files marked or flagged for write-in-place treatment). Whereas many or most data blocks can be managed in accordance with a write-anywhere approach, selected files and/or data blocks can be managed in accordance with a write-in-place approach by the write-anywhere filesystem. The filesystem references a data block via a physical reference and a virtual reference. In a write anywhere approach, when the data block is written to storage, both the physical and the virtual references are updated to point to the newly written data. In a write-in-place approach within the write anywhere system, when the data block is written to storage, the virtual reference is modified while the physical reference is not modified.

A storage server implements a filesystem to manage storage in disks of a connected storage subsystem. As used herein, "disk" refers to any type of non-volatile storage device/means suitable for storing data. A disk may include any one or more of a conventional magnetic disk (e.g., hard disk), an optical disk (e.g., CD-ROM (compact disk—read only memory), DVD (digital video/versatile disc) based storage), magneto-optical (MO) storage, semiconductor-based storage (e.g., flash), etc. As used herein, a storage element refers to a storage resource that includes part or all of the storage space of a disk. Because disks can and do fail, data storage across the disks is generally provided with the storage organized into one or more layers of abstraction. The abstraction layers also allow a logical disk organization, for example, a volume or aggregate, to store larger quantities of data than can fit on a single disk. Aggregates can include multiple volumes of stored data. As used herein, "volume" refers to a logical abstraction of physical storage, combining one or more disks or parts of disks into a single logical storage object. The volumes may in turn be further logically broken down into other abstraction layers (e.g., plexes, RAID groups). Conversely, a system can be thought of as having multiple RAID groups, and/or any similar or comparable logical grouping, further abstracted into other layers of storage for purposes of data storage management. Many types of RAID arrays or redundant disk arrays are known, some based on standards, and some proprietary. RAID groups may use storage from multiple, separate disks.

While specific terminology may be used herein, the operations as described herein with respect to RAID groups and volumes can be generically applied to any type of logical grouping. The filesystem operates in conjunction with a logical grouping abstraction controller (e.g., a RAID controller) that manages the physical interfacing of the storage server to the storage hardware.

The filesystem can reference a data block via one or more volume block numbers (VBNs). In one embodiment, the filesystem references a data block through a physical VBN (PVBN) and a virtual VBN (VVBN). The PVBN and the VVBN are used for data block aliasing, or referencing the data. Both references refer to the same data. A PVBN provides a reference to the physical location of a data block. A VVBN provides an indirection reference to a virtual or logical location of the data block. The VVBN can be manipulated independently of the physical location of the data block. In a write-anywhere approach, the filesystem modifies both the PVBN and the VVBN of a modified data block on write allocation to store the modification from memory back to disk. The write-anywhere filesystem with a write-in-place feature can hold the PVBN constant for an active or dirty data block while modifying the VVBN for the block. Thus, the virtual reference of the active or modified data block can be changed while its physical reference remains unchanged. The filesystem thus writes the modified data back to the same physical location, and points to the original physical location with a different virtual block number reference.

In many storage system implementations, filesystems maintain a filesystem image or point-in-time copy for purposes of recovery. The image provides a physical block number reference structure copy and/or a virtual reference copy to enable recovery of a data block in case of system failure. For example, Network Appliance Filer products provide a Snapshot™ of the WAFL filesystem. If an active data block is part of a filesystem image, the old data can be moved or copied out to a new location prior to writing the new data to the physical location. By maintaining the physical location of an active data block, and by moving old data associated with an active data block to a new location, a write-in-place approach is available for a write-anywhere filesystem that generates point-in-time copies. The write-in-place approach allows the filesystem to retain whatever physical sequential properties the file had prior to modification of a data block within the file. Additionally, the write-anywhere filesystem can continue to operate largely unaffected. That is, files are generally treated as write anywhere, and some files are handled through a write-in-place approach. The point in time access and data access can remain unchanged. From the perspective of performance, the write-in-place approach may degrade some read or write performance within the write-anywhere filesystem while improving some other read and write performance. However, the general operation of the write-anywhere filesystem may be able to remain unchanged. In a practical implementation, write-in-place and/or write-anywhere files/blocks may be marked (e.g., with metadata in the filesystem) to allow unchanged operation of the write-anywhere features of the filesystem while being able to selectively introduce write-in-place for other files/blocks.

FIG. 1 is a block diagram of an embodiment of a storage server with a write-in-place module coupled to a storage subsystem. System 100 includes clients 102-104, which represent computing devices that access data on the storage system via read and/or write operations. Clients 102-104 are coupled to communication network 110. As used herein, coupling refers to any type of connectivity, whether electrical, mechanical, and/or communicative. Coupling of one device to another may occur through other hardware. Software components can be coupled through function calls, or other invocations of one routine/subroutine by another. Communication network 110 represents any type of network with associated hardware and software components. Network 110 can include one or more of a local area network (LAN), wide area network (WAN), metropolitan area network (MAN), global area network (GAN) such as the Internet, or any combination thereof. The connectivity hardware may include Category-5 or other twisted pair cable, coaxial cable, wireless communication transceivers, etc., as well as flow direction hardware (e.g., interface circuits/cards, switches, routers, servers). Each client 102 and 104 represents a computing device that accesses data stored in storage subsystem 130, and may be a conventional desktop computer, a laptop computer, workstation, a network server, mobile device such as a cellular telephone or PDA (personal digital assistant), etc. Storage server 120 is coupled to clients 102-104 via network 110, and storage server 120 services requested access operations generated by clients 102-104. The access may be dependent on the type of request made, the client permissions, etc.

Storage server 120 provides one example of a storage server, and includes write-in-place module 124, which enables write-anywhere filesystem (FS) 122 of storage server 120 to selectively store one or more files with a write-in-place approach. Storage server 120 may provide clients with file-level services, as with traditional file servers; alternately, or in addition, storage server 120 may provide clients with block-level access to stored data. Storage server 120 can thus provide file-based (e.g., NAS (network attached storage)) services and/or block-based (e.g., SAN (storage area network)) services. The data services, whether file-level or block-level, include providing access to storage subsystem 130, for either data storage (write) and/or data retrieval (read).

In one embodiment, storage server 120 has a distributed architecture. With a distributed architecture, storage server 120 may include a separate N-("network") module and a D-(disk) module (neither shown in FIG. 1). The N-module couples storage server 120 to communication network 110 to communicate with clients 102-104, and the D-module includes the file system/storage management functionality and couples storage server 120 to storage subsystem 130 to communicate with the disks. The N-module and D-module communicate with each other using an internal protocol. In an alternate embodiment, storage server 120 has an integrated architecture, with network and data components contained within a single box and/or single circuit component/manufacture. Storage server 120 may further be coupled through a switching fabric to other similar filers/file servers (not shown), each having its own local storage subsystem. In this way, one or more storage subsystems can form a single storage pool, to which a client of any of the file servers may be provided access.

Storage server 120 may be coupled locally to storage subsystem 130, which includes one or more disks 132-134. Disks 132-134 are examples of disks as previously described. Storage server 120 includes one or more connectors and/or connection ports with which to couple to storage subsystem 130. The connectors and/or ports may be connection points for fiber optic cable, coaxial cable, twisted-pair communication lines, and/or secure wireless connections. The connection may support point-to-point or multi-drop connections. Storage server 120 manages storage subsystem 130, including receiving and processing read and/or write requests to data, maintaining data structures, organizing the physical resources of the disks into logical storage resources, etc. The data structure and logical storage resources are constructs for storage management to allow more storage in system 100, provide data access reliability, etc.

Storage server 120 includes write-anywhere filesystem (FS) 122, which represents a filesystem executed on storage server 120. Storage server 120 will generally manage data in accordance with write-anywhere filesystem 122. Storage server 120 also includes write-in-place module 124. Write-in-place module 124 extends the capability of write-anywhere filesystem 122 to include the ability to selectively store files in place. Thus, write-in-place module 124 may enhance the typical operation of write-anywhere filesystem 122.

Figure 2:
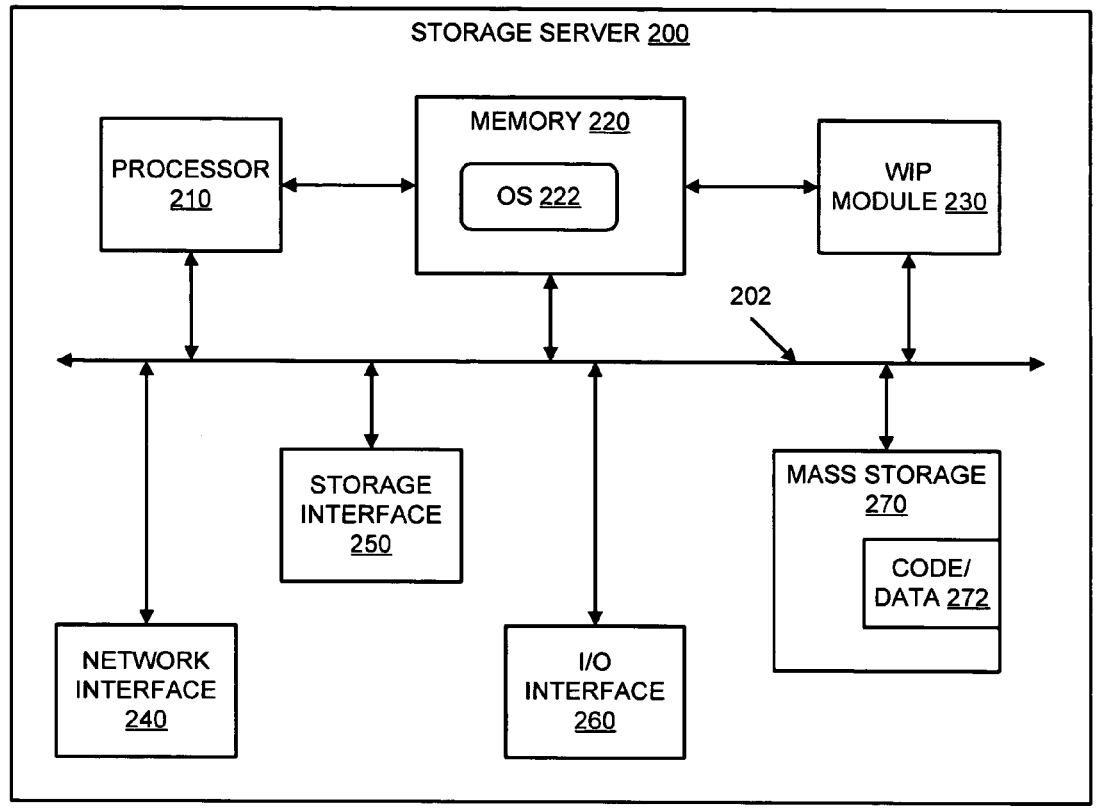
FIG. 2 is a block diagram of an embodiment of a storage server with a write-in-place module.

FIG. 2 is a block diagram of an embodiment of a storage server with a write-in-place module. Storage server 200 provides an example of a storage server, and may be one example of storage server 120 of FIG. 1. Storage server 200 includes one or more processors 210, and memory 220 coupled to processor 210. Processor 210 may include any type of microprocessor, central processing unit (CPU), processing core, etc., to enable performing operations related to storage management and servicing data access requests. Processor 210 controls the overall operation of storage server 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 represents the main memory of storage server 200 to provide temporary storage for code or data to be executed by processor 210. Memory 220 may include read-only memory (ROM), flash memory, one or more varieties of random access memory (RAM, e.g., static RAM (SRAM), dynamic RAM (DRAM), synchronous DRAM (SDRAM), etc.), or a combination of memory technologies. Memory 220 stores, among other things, operating system (OS) 222 that provides one or more functions of storage server 200. OS 222 includes the write-anywhere filesystem that normally manages data in a storage system of which storage server 200 may be a part.

In one embodiment, storage server 200 includes write-in-place (WIP) module 230. WIP module 230 may include hardware and/or software. In one embodiment, WIP module 230 is included within OS 222. WIP module 230 is described in more detail below, and in general, WIP module 230 detects one or more files to which write-in-place rather than write-anywhere write processing management should apply. In practice, a flag or other indicator are stored as part of a metadata file having information about how a particular data block or data blocks should be handled by the filesystem. The flag or indicator provides information that is read by the filesystem when the filesystem writes a data block. The reading of the information can trigger a routine call or an interrupt to cause the write-anywhere filesystem of OS 222 to relinquish write management to WIP module 230 for the flagged file, or data block associated with the file. Whereas OS 222 may default to the use of the write-anywhere filesystem, when a particular flag is detected, the write-anywhere filesystem can invoke WIP module 230 to write the data for data blocks of the flagged file. Note that while such operations may take place when data is written, a read of the data may be unaffected. WIP module 230 could be provided as a programmable circuit component coupled to bus system 202 if hardware, or if software as part of OS 222 or as an application or program kernel or linked executable running on OS 222, or some combination of these.

The write-anywhere filesystem of OS 222 can detect modified data blocks and execute a write allocation routine to determine where and how to write the modification back to disk. If the data block is marked as write-in-place, the write allocation routine works in conjunction with WIP module 230 or executes WIP module 230 to write the data block to disk. Because the detection of modified data blocks and general write allocation are known, they will not be discussed in detail herein.

Processor 210 and memory 220 are coupled to bus system 202. Bus system 202 is an abstraction that represents any one or more separate physical buses, communication lines/interfaces, and/or multi-drop or point-to-point connections, connected by appropriate bridges, adapters, and/or controllers. Therefore, bus system 202 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394-1995 bus, published Aug. 30, 1996, commonly referred to as "Firewire."

Also coupled to processor 210 through bus system 202 are one or more network interface(s) 240, one or more storage interface(s)/adapter(s) (or storage interface adapters) 250, one or more input/output (I/O) interface(s) 260, and one or more internal mass storage device(s) 270. Network interface 240 enables storage server 200 to communicate with remote devices (e.g., clients) over a network and may be, for example, an Ethernet adapter. Storage interface 250 enables storage server 200 to access a storage subsystem and may be, for example, a Fibre Channel adapter, a SCSI adapter, a network adapter, etc. Storage server 200 may typically be accessible to electronic or computer "users" rather than human users. Thus, I/O interface 260 may include one or more interface components to connect storage server 200 with other electronic equipment, for example, custom connections, blade adapters, etc. Additionally, storage server 200 could be made to be accessible to a human user, and thus have video, audio, and/or alphanumeric interface through I/O interface 260. Internal mass storage 270 may be or include any conventional medium for storing large volumes of data in a non-volatile manner. Mass storage 270 holds data and/or instructions in a persistent state (i.e., the value is retained despite interruption of power to storage server 200). Mass storage 270 includes code and/or data 272 that may be accessed and placed in memory 220 for execution by processor 210.

Figure 3:
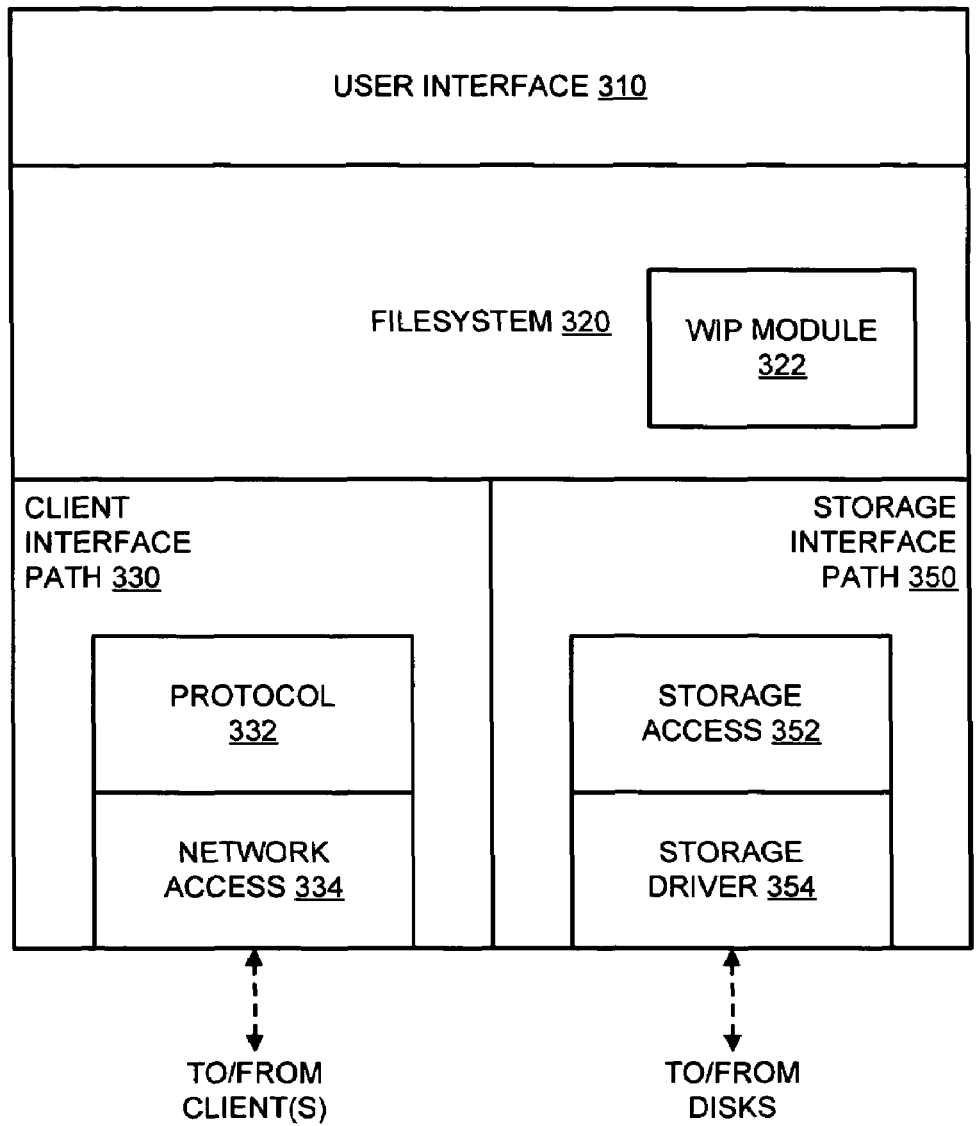
FIG. 3 is a block diagram of an embodiment of an operating system of a storage server having a write-in-place module in a filesystem layer.

FIG. 3 is a block diagram of an embodiment of an operating system of a storage server having a write-in-place module in a filesystem layer. Operating system 300 is one example of an operating system such as OS 222 of FIG. 2. As shown, operating system 300 includes several modules or functional components, which may also be referred to as "layers." One layer includes user interface 310, to provide access to a user, for example, a human storage network administrator, a management system, a diagnostic server, etc. Filesystem 320 is located logically below user interface 310. Filesystem 320 is a software kernel managed by the operating system that tracks/maintains a directory structure (hierarchy) of data stored in an associated storage subsystem, and manages read/write operations on the data (i.e., executes read/write operations on the disks in response to requests). Filesystem 320 is a write-anywhere filesystem that includes write-in-place module 322 for selective write-in-place operations. Filesystem 320 references data via a physical reference and a virtual reference. In a write anywhere approach, when data in storage is overwritten, the write-anywhere filesystem updates both the physical and the virtual references to point to the newly written data. In a write-in-place approach within the write anywhere system, when the data in storage is overwritten, write-in-place module 322 updates the virtual reference while leaving the physical reference unaffected.

Logically below filesystem 320, operating system 300 includes client interface path 330, and storage interface path 350. Client interface path 330 is depicted with protocol layer 332 and network access layer 334 associated with protocol layer 332, to allow filesystem 320 access over a network with clients, and particularly to client applications. Client interface path 330 may be understood to include more components than what are depicted in FIG. 3. Protocol layer 332 implements one or more of various higher-level network protocols, such as Network File System (NFS), Common Internet File System (CIFS), Hypertext Transfer Protocol (HTTP) and/or Transmission Control Protocol/Internet Protocol (TCP/IP), Fibre Channel Protocol (FCP), and/or iSCSI Protocol (SCSI over TCP/IP). Many protocols can be supported, with different protocols applicable to separate connections with different clients. The protocol to use in any particular connection may be established prior to operation of the system, or negotiated at run time. Network access layer 334 includes one or more drivers or other medium-interface software routines/programs that implements a lower-level protocol to implement the protocol of protocol layer 332 in a physical interface to communicate over the network, such as Ethernet.

Storage interface path 350 includes storage access layer 352 and storage subsystem driver layer 354. Storage interface path 350 is also to be understood as merely representative, and may include more components and/or layers than what are depicted. Storage interface path 350 can include one or more storage interface adapters, which provides the hardware to couple to the storage system. Storage access layer 352 implements a disk storage protocol, such as RAID, and storage subsystem driver layer 354 implement a lower-level disk access protocol, such as Fibre Channel Protocol (FCP), SCSI, advanced technology attachment (ATA), serial ATA (SATA), serial attached storage (SAS), etc., which may implement commands/requests made by the higher level protocol. To facilitate the description of the following details herein, it will be assumed that storage access layer 352 implements RAID, such as RAID-4, RAID-DP (created by Network Appliance Inc.), etc., and therefore may alternatively be referred to as RAID layer 352.

Figure 4:
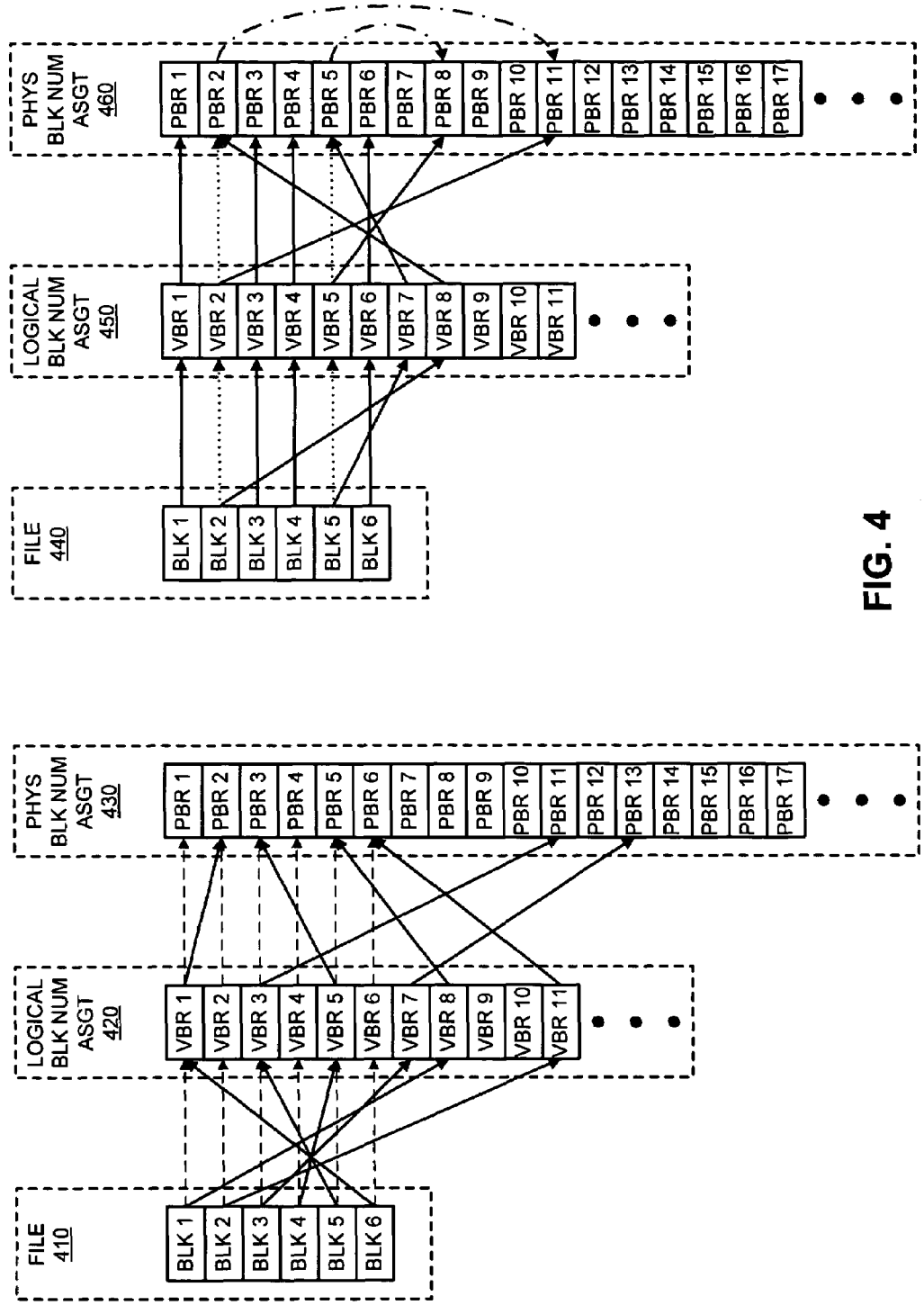
FIG. 4 is a block diagram of an embodiment of a file having data blocks spread across physical storage space with a write-anywhere technique, and a file maintaining a sequential order of data blocks in physical storage space with a write-in-place technique.

FIG. 4 is a block diagram of an embodiment of a file having data blocks spread across physical storage space with a write-anywhere technique, and a file maintaining a sequential order of data blocks in physical storage space with a write-in-place technique. A write-anywhere filesystem that is enabled to provide write-in-place storage services can generate different storage scenarios for data blocks associated with different files. File 410 is handled with write-anywhere, while file 440 is handled with write-in-place. Both files 410 and 440 are considered to have been initialized within the storage system when amounts of contiguous storage space sufficient to provide physical sequence of the files would be available. A header or metadata may be maintained by the filesystem to indicate properties of the files (e.g., whether to apply write-in-place, level of priority) and determine how to manage individual files and, by extension, individual data blocks of particular files. An operation on a data block typically includes referencing the metadata to determine how the data block is to be treated (based on the association of the data block with a file).

File 410 includes blocks (blk) 1-6, which represent blocks of any size applicable to the storage server filesystem. Blocks 1-6 of file 410 are mapped or associated with virtual block number references (VBRs) 1-11. Other VBRs may be present in logical block number assignment 420. An example of a VBR is a VVBN, which is discussed above. The VBRs of logical block number assignment (blk num asgt) 420 are indirection files that provide a way to group and operate on data blocks at least partially independently from their physical location. The indirection blocks or files point to physical block number assignment (phys blk num asgt) 430. Physical block number assignment 430 includes physical block number references (PBRs) 1-17. Other PBRs may be present in physical block number assignment 430. The PBRs are physical block number indirection files that indicate the physical location of data stored on disk. An example of a PBR is a PVBN, which is discussed above. The physical block number assignment abstraction will generally include more entries than the logical block number assignment abstraction.

The dashed lines from file 410 to logical block number assignment 420 and from logical block number assignment 420 to physical block number assignment 430 represent an initial condition of the system, where the file is stored in contiguous locations, which are changed as the file ages. The resulting aged file is depicted by the solid lines. For example, block 1 of file 410 is initialized with logical block number assignment VBR 1 and physical block number assignment PBR 1, and similarly for blocks 2-5 corresponding to VBRs 2-5 and PBRs 2-5. After the file has been modified a number of times, block 1 may reference VBR 8, which may reference PBR 5. Block 2 is shown in a similar manner referencing VBR 11, which references VBR 6. Any physical sequence of file 410 would likely be lost after such aging.

In contrast to file 410, file 440 is managed with a write-in-place technique. Blocks 1-6 of file 440 may initially begin with reference to VBRs 1-6 of logical block number assignment 450, which respectively may have begun with reference to PBRs 1-6 of physical block number assignment 460. In contrast to the aging of file 410, a write-in-place approach on file 440 maintains the physical sequence of file 440 at the physical block number assignment, even though the logical block number assignment may be changed. Thus, block 2 may reference VBR 8, which will in turn reference PBR 2, which is the same PBR that would have corresponded to block 2 initially. Thus, if block 2 is active for write (i.e., modified), it is assigned a new logical block number reference (VBR 8), but maintains the same physical block number assignment (PBR 2). In one embodiment, file 440 is part of a filesystem image, and the old data that existed at PBR 2 is moved to PBR 11 prior to overwriting PBR 2. Thus, the old data may be retained. To maintain the image, VBR 2 that pointed to the old data of PBR 2 will be changed to point to the old data at PBR 11. If block 2 were again changed, the data of PBR 2 that replaced the data moved to PBR 11 could also be moved to a new PBR. VBR 8 would then be modified to point to the new PBR, and another VBR would be assigned to point to the newly updated data at PBR 2. In this way, the system maintains compatibility between write-anywhere and write-in-place files as relates to the management of the data by the filesystem.

Figure 5:
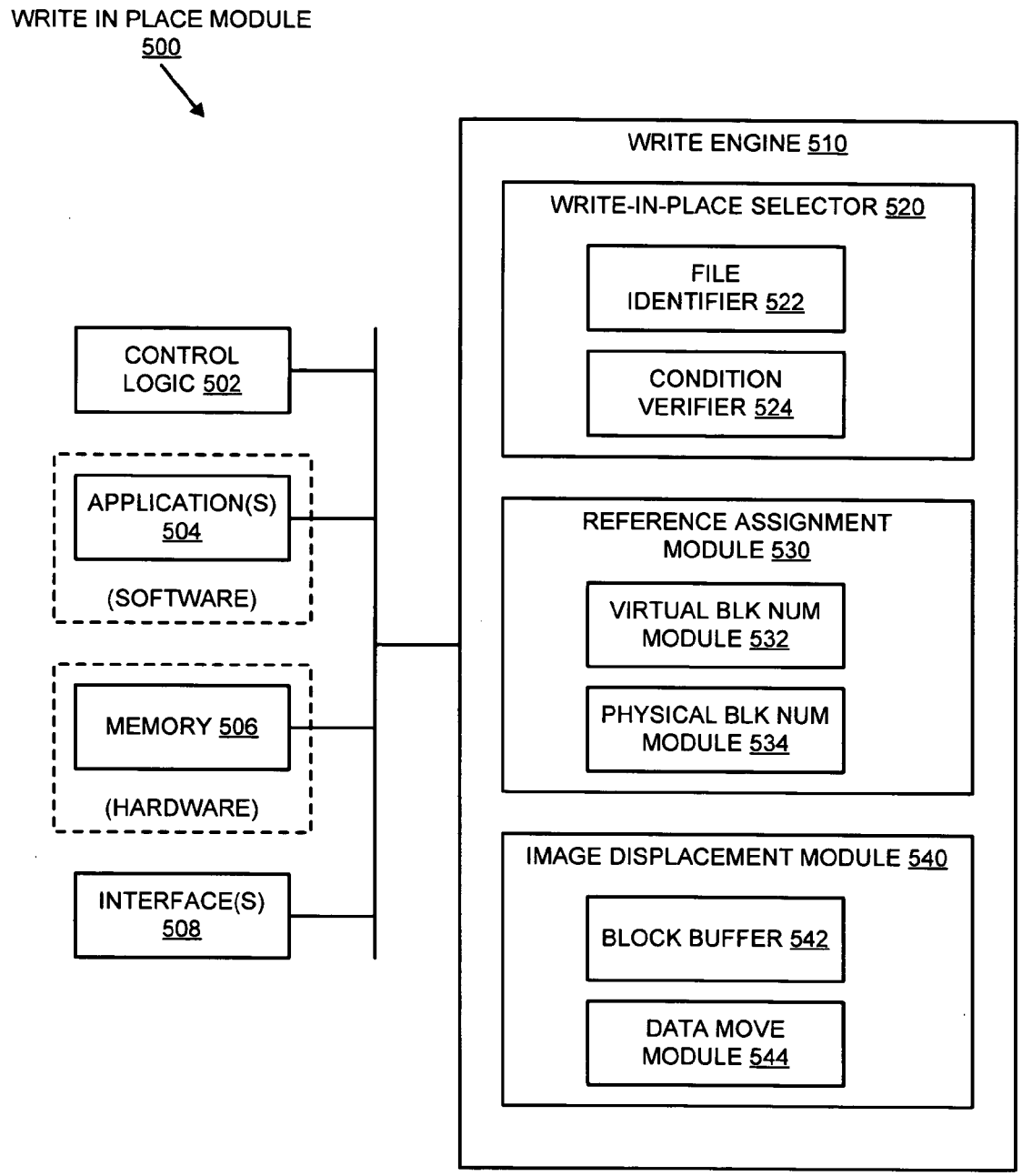
FIG. 5 is a block diagram of an embodiment of a write-in-place module.

FIG. 5 is a block diagram of an embodiment of a write-in-place module. Write-in-place module 500 includes control logic 502, which implements logical functional control to direct operation of write-in-place module 500, and/or hardware associated with directing operation of write-in-place module 500. Logic 502 may be hardware logic circuits and/or software routines. In one embodiment, the logic may be instructions executing on a processor of a computing device. Thus, in a software implementation, logic 502 provides instructions for the control of operation of a processor that executes write-in-place module 500. In a hardware implementation, logic 502 represents circuitry that provides functional control (e.g., outputs on a signal line). Logic 502 may also refer to the operating instructions and circuitry that control, for example, an embedded processor in an implementation with software and hardware combined.

In one embodiment, in an implementation that is partially or wholly software, write-in-place module 500 includes one or more applications 504, which represent code sequences and/or programs that provide instructions to control logic 502. Applications 504 may be code executing on a common processor that executes write-in-place module 500.

In one embodiment, write-in-place module 500 includes memory 506 and/or access to memory resource 506 for storing data and/or instructions. In a hardware implementation, a hardware circuit that represents write-in-place module 500 may include a memory device. In a software implementation, memory 506 can be understood to refer to the ability of a software module to store data in memory and access registers for the execution of code. Thus, memory 506 may include memory local to write-in-place module 500, as well as, or alternatively, including memory of a storage server on which write-in-place module 500 resides.

Write-in-place module 500 also includes one or more interfaces 508, which represent access interfaces to/from (an input/output interface) write-in-place module 500 with regard to entities external to write-in-place module 500. In one embodiment, write-in-place module 500 is accessible as a component of a system (e.g., a filer) that can be manipulated externally by a user through a user interface. Thus, interfaces 508 may include graphical user interfaces, keyboards, pointer devices, etc., in an implementation where write-in-place module 500 is accessible to human users. In an alternative embodiment, write-in-place module 500 executes "behind the scenes" to a human user, meaning the module performs its functions without being visible to the human user. However, even if not visible to a human user as a separate component, write-in-place module 500 can be accessible to external electronic components, or external software applications. Thus, in one embodiment, interfaces 508 includes mechanisms through which external programs may access the module (e.g., drivers in a hardware implementation of write-in-place module 500, application program interfaces (APIs) in a software implementation, etc.).

Write-in-place module 500 also includes write engine 510, which represents one or more functional components that enable write-in-place module 500 to provide write-in-place mechanisms in a write-anywhere filesystem. Write engine 510 may be implemented as hardware and/or software, and provides the write-in-place functionality to write-in-place module 500. The functions or features of the components include, or are provided by, one or more of write-in-place selector 520, reference assignment module 530, and image displacement module 540. Each module may further include other modules to provide specific functionality. As used herein, a module refers to routine, a subsystem, etc., whether implemented in hardware, software, or some combination. One or more modules can be implemented as hardware while other(s) are implemented in software.

Note that in addition to the components shown in FIG. 5, write engine 510 may include components of a write-anywhere write allocation engine of the filesystem. The write allocation engine of the filesystem refers to one or more kernels of the filesystem that determine (e.g., through rules and/or write algorithms) where to write data in a write-anywhere manner. Thus, mechanisms for detecting dirty data blocks to write to disk, writing in accordance with a write-anywhere method, or other functions of write allocation of a filesystem may be assumed, even though they are not displayed in FIG. 5.

Write-in-place selector 520 enables write engine 510 to determine and select one or more files to which write-in-place should be applied within a write-anywhere filesystem. Write-in-place is selectively applied to files that have associated header files that indicate write-in-place treatment of its data. Write-in-place selector 520 includes file identifier 522 to identify a file to which write-in-place should be applied. In one embodiment, write-in-place processing identifies a block as eligible for write-in-place if the file is marked or flagged (e.g., in a header file) as requesting write-in-place. Data blocks may have associated headers within the filesystem that include information specifying a request for write-in-place treatment. The files may be referred to as "requesting" or "indicating" write-in-place when their headers include information, which when accessed by the filesystem will result in the data being managed with a write-in-place approach. The headers are stored by the filesystem, and can be accessed to determine how to manage the data block. The flag or indicator is a feature that can be included by a developer at initialization of the file. A data block having a flag can be referred to as a requesting data block.

In one embodiment, a requesting data block may further need to be not shared with other files to be eligible for write-in-place treatment. A data block that is shared among multiple files may be referred to as being "dense." In contrast, a non-dense data block has data associated with only a single file. A dense data block refers to a data block that is referenced from multiple files. In one embodiment, a file server scans a storage system to identify active data blocks that contain the same data. When two files have data blocks that contain the same data, the file server can eliminate the redundant data and provide a reference from both files to the same data block. In contrast, a non-dense data block is only referenced by a single file. A dense data block may be denied write-in-place treatment to avoid write-in-place of data associated with a non-marked, or non-requesting, file.

Additionally, filesystem images can be made of the virtual references and/or the physical references (consider the VBR and PBR blocks of FIG. 4). A requesting data block may further need to excluded from an image of the physical references. An image of the physical assignment of data locks the physical blocks and prevents movement of the data from one block to another. Thus, if there are image files relying on the association of a particular PBR with a particular data block, write-in-place may be denied. Condition verifier 524 of write-in-place selector 520 can determine whether the conditions allowing write-in-place are met. Thus, if a data block needs to satisfy the conditions of being: marked, dense, and not part of a filesystem image, condition verifier 524 verifies those conditions. Other conditions could be used in addition to, or in place of the conditions above, depending on the implementation.

Write engine 510 includes reference assignment module 530 to assign or associate references with data blocks. Reference assignment module 530 includes virtual block number (blk num) module 532 that assigns a virtual reference to a data block. Virtual block number module 532 may be the virtual block number assignment mechanism of the write-anywhere file system. That is, the assignment of a new virtual or logical block number for an active data block is the traditional operation of a write-anywhere filesystem. In a write-anywhere filesystem, the virtual block number assignment continues as with non-write-in-place data blocks, but the physical block number references are treated differently. Thus, reference assignment module 530 includes physical block number module 534 that assigns a physical reference to associate with a data block and its associated virtual block number reference. Physical block number module 534 provides the reference pointed to by the virtual block number reference assigned to the data block. As suggested above, in a simple implementation of write-in-place within a write-anywhere system, the same physical reference assignment can be used as old data is overwritten with new data. In an implementation that keeps old data for purposes of backup (reverting to or reconstructing old data, restoring a system failure, etc.), the old data is copied or moved or written to a new physical block number assignment, and the new data is subsequently written in to the old or original physical block number assignment for the data block. Physical block number module 534 provides the new assignment to the old data and assigns the old location to the new data (provides the block number reference to the new virtual block number reference.

Write engine 510 also includes image displacement module 540 to perform the data move of old data in an implementation where old data is retained. Image displacement module 540 works in conjunction with reference assignment module 530 to perform the moving of the data to the block numbers assigned. Block buffer 542 provides a buffer location to which the old data can be temporarily written. Block buffer 542 is optional, and in one embodiment, the moving of an old data block simply performs a write of the contents of the original physical block to a newly assigned block. The use of a buffer adds an additional operation that may be a practical reality in some systems (i.e., the copying from one location to another involves reading out data to a register on a data bus of the storage, which is then written from the register to a new location). Image displacement module 540 includes data move module 544 that performs the operation or instruction to move the data from one location to another. Data move module 544 may be the buffer controller or a controller on a data bus of the storage device.

The descriptions herein of managers or modules, describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 6:
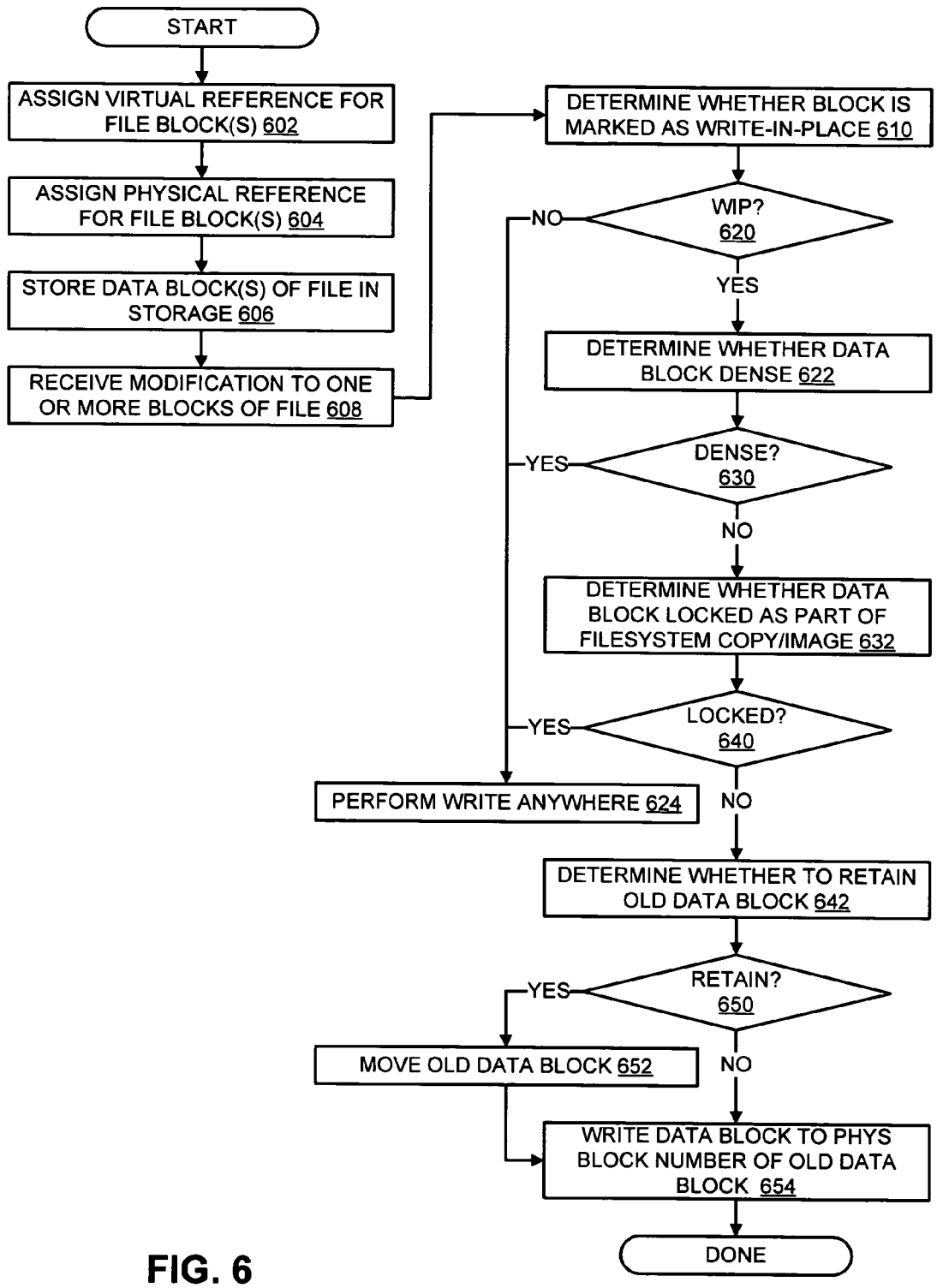
FIG. 6 is a flow diagram of an embodiment of a process for determining how to store a file in a system that has write-anywhere and write-in-place mechanisms.

FIG. 6 is a flow diagram of an embodiment of a process for determining how to store a file in a system that has write-anywhere and write-in-place mechanisms. A data block in a storage system is typically referenced by at least one level of indirection. Thus, rather than managing the data block by its physical location, an index node (or inode) can point to a data block. The data block can then be managed via a virtual/logical block number assignment. The logical assignment ultimately references the physical location of the data on disk. In one embodiment, the data is stored as blocks, which may be larger or smaller than a file. A file may include data stored on multiple blocks. The filesystem initially assigns virtual block number reference(s) for the data block(s) of the file, 602. The filesystem also assigns physical block number reference(s) for the file data block(s), 604. The physical block number references correspond to the physical location of the data on disk. The virtual block number references reference the physical block number references. The data block(s) of the file are stored in a non-volatile storage, 606. When data associated with a file is modified, the data is read from disk, and the modification is implemented in volatile memory prior to writing the changes back to disk (i.e., non-volatile storage). A modified data block in memory may be referred to as a dirty block. A dirty block is made not dirty when the data is written to storage. A filesystem can write modified data in accordance with a write-in-place mechanism in a write-anywhere filesystem. The write-in-place mechanism affects how the write-anywhere filesystem writes the dirty block to storage. Rather than implementing traditional write-anywhere, the write-in-place mechanism allows data to be modified and written in place in the storage from the dirty block in memory.

A modification is received at the filesystem. "Receiving" the modification refers to receiving an indication that a data block is changed, or detecting that a data block is changed in volatile memory and marked as dirty (i.e., the filesystem detects a data block is changed because a write request is processed by the filesystem for the data block). Thus, the filesystem receives a request to write a data block and accesses the modified data block in memory to write the data to storage. When a modification to one or more data blocks of a file is received, 608, a write allocation mechanism of the write-anywhere filesystem determines how to deal with the dirty data block(s). The filesystem generates a new virtual block number assignment for a dirty data block. The write-anywhere filesystem determines whether the data block is associated with a file marked as write-in-place, 610. If the data block is marked as write-in-place, 620, the filesystem may further determine whether the marked data block meets conditions for write-in-place. In one embodiment, the filesystem performs write-in-place on any data block marked as write-in-place. In another embodiment, one or more conditions are applied to determine whether a data block marked as write-in-place should be instead managed according to a write-anywhere mechanism of the filesystem. If the data block is not marked as write-in-place, 620, the filesystem performs write-anywhere processing on the data block, 624.

If the block is marked as write-in-place and further conditions are to be applied, the filesystem applies the further conditions. For example, the filesystem may determine whether the data block is dense, 622. A dense data block is one that is shared among multiple files, or has data from more than a single file. If the data block is dense, 630, write-anywhere is performed, 624. If the data block is not dense, 630, the filesystem may further determine whether the data block is locked as part of a filesystem copy/image, 632. As used herein, "locked" refers to the data block being subject to a backup storage image generator. If a data block is to be part of the data backed up with an image copy, the data block is considered to be locked, because the image generators rely on the data being in an expected physical location for data blocks that are subject to the backup image generated. Certain filesystem backup mechanisms may lock the physical block associated with a data block, which prevents write-in-place within the write-anywhere filesystem. Thus, if the data block is locked, 640, write-anywhere is performed on the data block, 624.

If the data block meets the conditions of write-in-place, the filesystem determines whether to retain the old data block associated with the dirty data block in memory, 642. If the system retains the old data, 650, the old data block is moved out of the physical location to a new physical location, 652. The old logical block number reference is modified/updated to point to the new physical location. If the old data block is not to be retained, 650, or after the old data block has been moved, 652, the filesystem writes the dirty data block to the physical block number space of the old data block, 654. The new data is thus "written in place."

The flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel. Additionally, as provided in the description above, not all of the operations shown are necessarily required.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for storing data, comprising:
   storing a first data block in a storage element, the first data block referenced by a filesystem with a physical block number reference and a virtual block number reference;
   identifying the first data block as a write-in-place data block;
   receiving an updated data block having a modification to the first data block;
   storing the updated data block in the storage element, the updated data block referenced by the filesystem with the physical block number reference and a different virtual block number reference;
   verifying that the first data block satisfies a condition of write-in-place; and
   performing write-anywhere processing on the first data block if the data block fails to satisfy the condition.

2. The method of claim 1, wherein the physical block number reference comprises an indirect block number reference to a physical block number.

3. The method of claim 1, wherein the virtual block number reference comprises an indirect block number reference to a virtual block number.

4. The method of claim 1, wherein storing the updated data block in the storage element with the physical block number reference further comprises reading the first data block from the storage element with the physical block number reference; and storing the first data block in the storage element with a different physical block number reference and with the same virtual block number reference.

5. The method of claim 4, further comprising marking the first data block as dirty.

6. The method of claim 1, wherein verifying that the first data block satisfies the condition of write-in-place further comprises determining that the first data block is not shared among multiple files; and wherein storing the updated data block in the storage element includes storing the updated data block in the storage element if the first data block is not shared, otherwise storing the updated data block in the storage element with a different physical block number reference from the first data block.

7. The method of claim 1, wherein verifying that the first data block satisfies the condition of write-in-place further comprises determining whether the first data block is part of a filesystem physical block number reference copy; and wherein storing the updated data block in the storage element includes storing the updated data block in the storage element if the first data block is not part of a filesystem physical block number reference copy, otherwise storing the updated data block in the storage element with a different physical block number reference from the first data block.

8. An article of manufacture comprising a computer readable storage medium having content stored thereon, which when accessed, provides instructions to:

maintain a write-anywhere filesystem that references a first data block stored in a non-volatile storage element with a physical block number reference and a virtual block number reference;

detect a modification to the first data block in a modified data block in memory;

write the modified data block from memory to the non-volatile storage element, including identifying the first data block as a write-in-place data block, the modified data block referenced by the write-anywhere filesystem with the physical block number reference and a different virtual block number reference;

verify that the first data block satisfies a condition of write-in-place; and perform write-anywhere processing on the first data block if the data block fails to satisfy the condition.

9. The article of manufacture of claim 8, the content to provide instructions for detecting the modification to the first data block comprises the content to provide instructions to mark the modified data block as dirty.

10. The article of manufacture of claim 9, the content to provide instructions for writing the modified data block from memory to the non-volatile storage element comprises the content to provide instructions to read the first data block from the non-volatile storage element having the physical block number reference; write the first data block in the non-volatile storage element having a different physical block number reference and with the same virtual block number reference; and write the modified data block from the memory to the non-volatile storage element having the physical block number reference and the different virtual block number reference.

11. The article of manufacture of claim 8, the content to provide instructions for identifying the first data block as a write-in-place data block further comprises the content to provide instructions to read a metadata file that indicates the first data block as part of a file marked as a write-in-place file.

12. A storage server comprising:
a filesystem that addresses data blocks stored in a storage element with a physical block number indirection file and a logical block number indirection file, the filesystem to write to the storage element a data block having a modification of a data block stored in the storage element, the filesystem having:
a write-in-place selector module to determine if write-in-place processing is to be applied to the data block; and
a reference assignment module to generate the physical block number indirection file and the logical block number indirection file associated with the data block; and
a storage interface adapter coupled to the filesystem to write the data block to the storage element in accordance with the filesystem.

13. The storage server of claim 12, wherein the write-in-place selector module is further to:
determine that a file with which the data block is associated is marked as a write-in-place file.

14. The storage server of claim 12, wherein the write-in-place selector module further comprises a condition verifier module to determine that the data block meets conditions for write-in-place processing, including determining that the data block is dense, and that the physical block number indirection file does not reference a locked physical storage location.

15. The storage server of claim 12, the filesystem further comprising an image displacement module to write data referenced by the physical block number indirection file to a different physical location before the storage interface adapter writes the data block to the storage element.

16. The storage server of claim 15, the image displacement module further comprising a data block buffer to buffer the data referenced by the physical block number indirection file in conjunction with writing the data to the different physical location.

* * * * *